United States Patent
Panciroli

(10) Patent No.: US 7,086,358 B2
(45) Date of Patent: Aug. 8, 2006

(54) METHOD AND DEVICE FOR CONTROLLING THE SPEED OF THE VALVES OF AN INTERNAL COMBUSTION ENGINE

(75) Inventor: Marco Panciroli, Ravenna (IT)

(73) Assignee: Magneti Marelli Powertrain S.p.A. (IT)

( * ) Notice: Subject to any disclaimer, the term of this patent is extended or adjusted under 35 U.S.C. 154(b) by 0 days.

(21) Appl. No.: 10/873,861

(22) Filed: Jun. 22, 2004

(65) Prior Publication Data
US 2005/0022760 A1    Feb. 3, 2005

(30) Foreign Application Priority Data
Jun. 23, 2003   (IT)   .................... BO2003A0390

(51) Int. Cl.
F01L 9/02   (2006.01)

(52) U.S. Cl. .................. 123/90.12; 123/90.13; 123/90.15; 123/90.11; 123/188.8; 251/30.01; 251/120; 251/129.03; 251/175

(58) Field of Classification Search ............. 123/90.12, 123/90.13
See application file for complete search history.

(56) References Cited

U.S. PATENT DOCUMENTS

| | | | | |
|---|---|---|---|---|
| 4,452,187 A | * | 6/1984 | Kosuda et al. ........... 123/90.16 |
| 5,477,149 A | * | 12/1995 | Spencer et al. ............. 324/418 |
| 5,531,192 A | * | 7/1996 | Feucht et al. ............. 123/90.12 |
| 5,577,468 A | * | 11/1996 | Weber ....................... 123/90.12 |
| 5,797,360 A | * | 8/1998 | Pischinger et al. ....... 123/90.11 |
| 5,988,985 A | | 11/1999 | Steinrück ...................... 417/53 |
| 6,167,852 B1 | * | 1/2001 | Kamimaru et al. ....... 123/90.11 |
| 6,192,841 B1 | * | 2/2001 | Vorih et al. ............... 123/90.12 |
| 6,739,293 B1 | * | 5/2004 | Turner et al. ............. 123/90.12 |
| 2003/0030226 A1 | * | 2/2003 | Durham ....................... 277/500 |
| 2004/0083995 A1 | | 5/2004 | Diehl et al. ............... 123/90.13 |

FOREIGN PATENT DOCUMENTS

| | | |
|---|---|---|
| DE | 101 27 205 | 9/2002 |
| WO | WO95/03490 | 2/1995 |
| WO | WO03/027449 | 4/2003 |
| WO | WO03/060293 | 7/2003 |

OTHER PUBLICATIONS

European Search Report for EP 04 10 2852 (Oct. 18, 2004).

* cited by examiner

*Primary Examiner*—Thomas Denion
*Assistant Examiner*—Kyle M. Riddle
(74) *Attorney, Agent, or Firm*—Howrey LLP

(57) ABSTRACT

A method of controlling the speed of the valves in an electro-hydraulic actuation unit for the valves of an internal combustion engine in which the pressure of the fluid in the hydraulic actuator of the valve is controlled during the final phase of closure of a valve.

16 Claims, 4 Drawing Sheets

METHOD AND DEVICE FOR CONTROLLING THE SPEED OF THE VALVES OF AN INTERNAL COMBUSTION ENGINE

CROSS REFERENCE TO RELATED APPLICATIONS

The present application claims priority to Italian Patent Application Serial No. BO2003A 000390 filed Jun. 23, 2003.

1. Field of the Invention

The present invention relates to a method of controlling the speed of the valves of an internal combustion engine.

In general, the valves of an internal combustion engine are moved mechanically by means of a camshaft. Alongside this technology, long consolidated in the automobile engineering sector, alternative systems are currently being tried out. These applicants are in particular experimenting with an electro-hydraulic actuation unit for the valves of an internal combustion engine of the type disclosed in European Patent 1,233,152 in the name of the applicants. This electro-hydraulic unit is driven by an electronic unit and makes it possible very accurately to vary the instants of opening and closure of each valve in accordance with a cycle assigned as a function of the angular speed of the crankshaft and other operating parameters of the engine, thereby substantially improving engine performance.

The electro-hydraulic unit currently being tested comprises, for each intake and/or exhaust valve of the engine, an electro-hydraulic actuation device which comprises a hydraulic actuator adapted axially to move the valve from the closed position to the position of maximum opening, overcoming the action of an elastic member adapted to maintain this valve in the closed position, and a hydraulic distributor valve adapted to regulate the flow of pressurized oil to and from this hydraulic actuator so as to control the displacement of the valve between the closed position and the position of maximum opening.

In order to provide for the pressurized oil, the electro-hydraulic unit being tested is provided with a hydraulic circuit comprising an oil collection tank, within which the oil to be supplied to the actuators is stored, and a pump unit adapted to supply pressurized oil to the various distributors by taking it directly from the collection tank. The electro-hydraulic unit disclosed in European Patent Application 1 233 152 comprises a slide distributor valve which is able to assume a first operating position in which it brings the linear hydraulic actuator into direct communication with the collection tank for the fluid at ambient pressure, a second operating position, in which it isolates the linear hydraulic actuator so as to prevent the flow of fluid to and from this actuator and a third operating position in which it brings the linear hydraulic actuator into direct communication with a branch containing the pressurized fluid.

The unit as disclosed has the substantial advantage that its structure is particularly simple, which ensures a high degree of reliability over time, thus enabling its use in the automobile engineering sector.

However, the tests under way have shown that each valve approaches its relative seat at too high a speed, causing impacts.

SUMMARY OF THE INVENTION

The object of the present invention is to provide a method of controlling the speed of the valves of an internal combustion engine able to limit the above-described drawback.

The present invention relates to a method of controlling of the speed of impact of the valves in an electro-hydraulic actuation unit for the valves of an internal combustion engine, the electro-hydraulic unit comprising a hydraulic actuator adapted to open a respective valve with a pressurized fluid, a spring opposing the hydraulic actuator in order to close the valve and to discharge the fluid from the hydraulic actuator to a collection tank, the method being characterized in that the pressure of the fluid is controlled in the hydraulic actuator, during the final phase of closure of the valve.

The present invention relates a device for controlling the speed of the valves of an internal combustion engine.

The present invention relates to a device for controlling of the speed of impact of the valves in an electro-hydraulic actuation unit for the valves of an internal combustion engine, the electro-hydraulic unit comprising a hydraulic actuator adapted to open a respective valve with a pressurized fluid, a spring opposing the hydraulic actuator in order to close the valve and to discharge the fluid from the hydraulic actuator to a collection tank, the device being characterized in that it comprises control means for controlling the pressure of the fluid in the hydraulic actuator, during the final phase of closure of the valve.

DESCRIPTION OF THE FIGURES

The present invention will be described below with reference to the accompanying drawings, which show various non-limiting embodiments thereof, and in which.

DETAILED DESCRIPTION OF THE INVENTION

Figure 1:
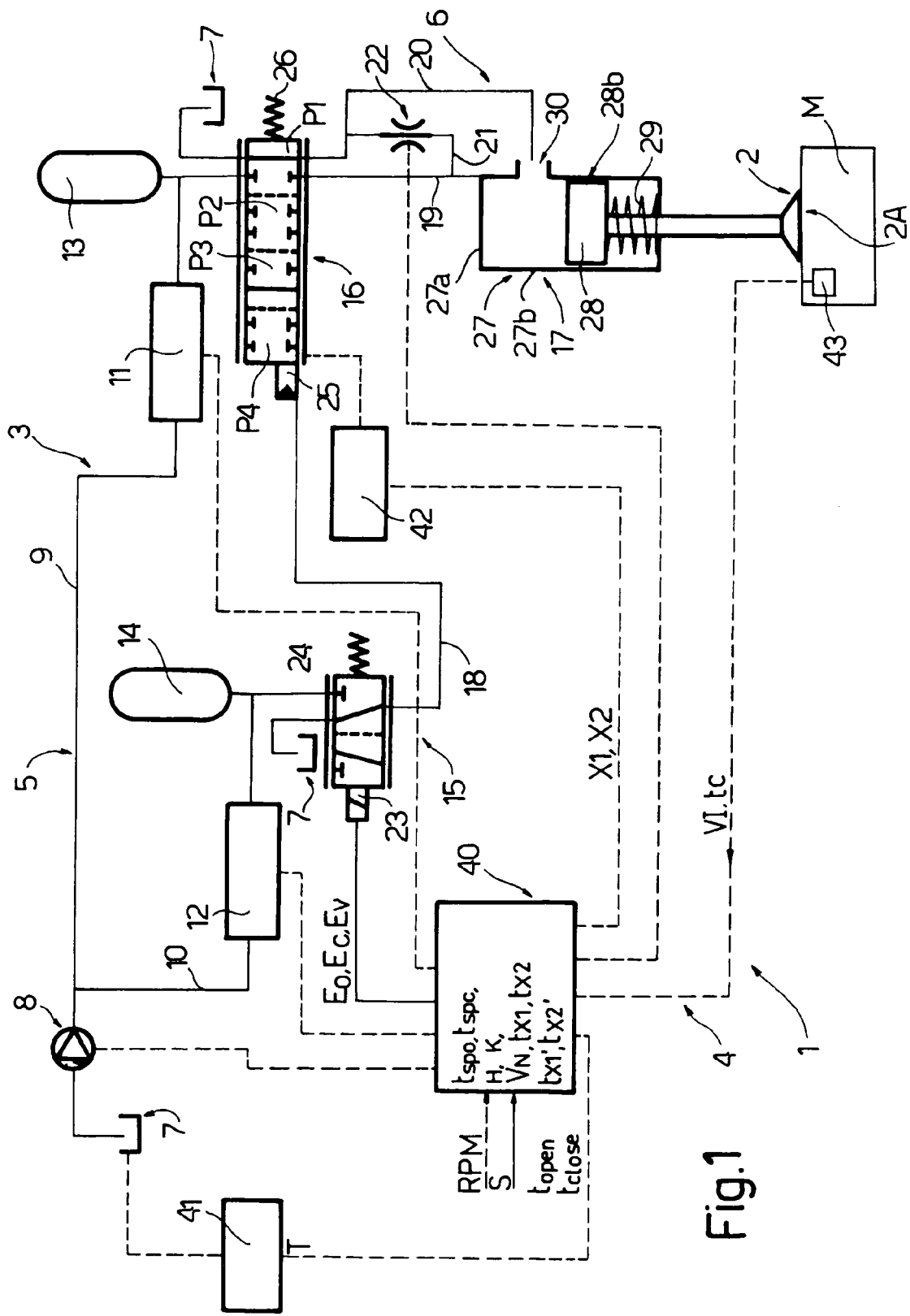
FIG. 1 is a diagrammatic view of the electro-hydraulic actuation unit for the valves of an internal combustion engine.

In FIG. 1, an electro-hydraulic unit for the actuation of the valves 2 of an internal combustion engine M is shown overall by 1. Only one valve 2, coupled to a respective seat 2A, is shown in FIG. 1, although it will be appreciated that the electro-hydraulic unit 1 is adapted to drive all the intake and exhaust valves of the engine M. In this description, the opening of the valve 2 is defined as the phase of transition of the valve 2 from the closed position to the position of maximum opening; the closure of the valve 2 is defined as the phase of transition of the valve 2 from the position of maximum opening to the closed position; and maintenance is defined as the phase during the which the valve 2 remains in the position of maximum opening. The terms opening, closing and maintaining the valve 2 consequently have the same meaning.

The unit 1 comprises a hydraulic circuit 3 and a control device 4. In turn, the hydraulic circuit 3 comprises a circuit 5 common to all the valves 2 and a plurality of actuation devices 6, each of which is associated with a respective valve 2. In FIG. 1, for reasons of simplicity, only one device 6 associated with its respective valve 2 is shown.

The circuit 5 comprises an oil collection tank 7, a pump unit 8 and two branches 9 and 10 which are supplied with pressurized fluid and along which respective pressure regulators 11 and 12 and respective pressure accumulators 13 and 14 are disposed in sequence. The two branches 9 and 10 of the circuit 5, downstream of the respective accumulators 13 and 14, are connected to the actuation devices 6, each of which comprises a control selector 15, a slide distributor valve 16 and a hydraulic actuator 17 rigidly connected to the valve 2. The selector 15 is connected to the branch 10, the tank 7 and a branch 18 which connects the selector 15 to the slide valve 16 in order to drive this slide valve 16.

The slide valve 16 is connected to the branch 9, the tank 7 and a supply branch 19 to the actuator 17 and an exhaust branch 20 from the actuator 17. The branch 19 and the branch 20 are connected by an exhaust branch 21, along which an orifice 22 is disposed. The function of the exhaust branch 21 and the orifice 22 is to slow down the valve 2 during the closing phase and to keep the speed of closure of the valve 2 constant. The slowing down of the valve 2 takes place in particular during the final part of the closing stroke of the valve 2, as will be described below.

The selector 15 is a three-way valve controlled by an electromagnet 23 and a spring 24 and is adapted to assume two positions: the spring 24, when the electromagnet 23 is not excited, maintains the selector in the first position, in which the branch 10 is closed off, while the branch 18 is connected to the tank 7 (FIG. 1); the electromagnet 23, when excited, overcomes the force of the spring 24 and disposes the selector 15 in the second position in which the branch 10 is connected to the branch 18.

The slide distributor valve 16 is a four-way valve driven by a piston 25 and a spring 26 and is adapted substantially to assume four operating positions shown by P1, P2, P3 and P4 in FIG. 1. Although the slide valve 16 has four operating positions P1, P2, P3 and P4, in practice it has only two stable positions, i.e. the end positions shown by P1 and P4 respectively in FIG. 1. The operating positions P2 and P3 are transit positions between the opposing operating positions P1 and P4. In the operating position P1, the branch 20 is connected to the tank 7, while the branch 9 and the branch 19 are disconnected; in the operating position P2, all the connections are discontinued; in the operating position P3, the branch 9 is connected to the branch 19, while the return branch 20 is closed off: for this reason, the operating position P3 is defined as the actuation position; the operating position P4 again shows the same characteristics as the operating position P2.

The linear hydraulic actuator 17 comprises a cylinder 27, a piston 28 connected to the valve 2 and a spring 29 adapted to maintain the valve 2 in the closed position. The cylinder 27 has a head 27*a* and a jacket 27*b*, along which a lateral discharge opening 30 is disposed. The piston 28 comprises a top 28*a* and a lateral surface 28*b* which, in specific positions, closes off the opening 30 of the piston 28.

Figure 7:
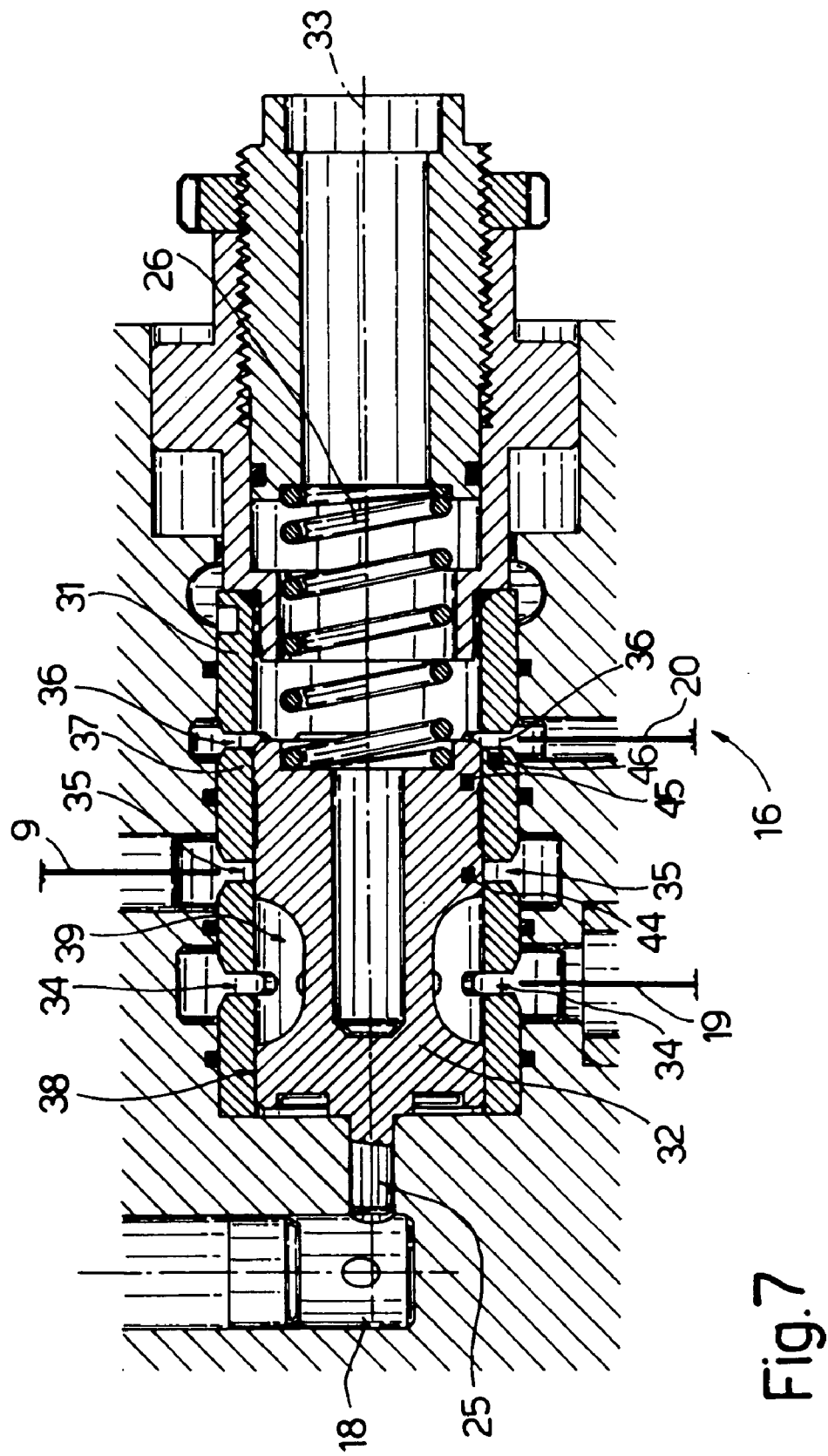
FIG. 7 is a view in section through a component of the unit of FIG. 1.

In order better to understand the operation of the unit 1, it is necessary to describe the slide distributor valve 16 from the constructional point of view with reference to FIG. 7, in which some components of the unit 1 are shown from the constructional point of view and bear the same reference numerals as in FIG. 1. The slide valve 16 comprises a bushing 31 and a slide 32 sliding in the bushing 31 along an axis 33. The branch 19, the branch 9 and the branch 20 communicate with respective series of radial holes 34, 35, and 36 provided in the bushing 31. The radial holes 34, 35 and 36 of each series are distributed about the axis 33, while the series of radial holes 34, 35 and 36 are distributed along the axis 33 with a spacing determined as a function of the geometrical characteristics of the slide 32, which comprises two surfaces 37 and 38 substantially flush with the bushing 31 and separated by a hollow portion 39. In substance, there is a geometrical relationship between the axial extension of the surfaces 37 and 38 and the hollow portion 39 and the axial position of the series of holes 34, 35 and 26 so as to define all the operating positions P1, P2, P3 and P4 of the slide 32. In particular, the dimensions of the slide 32 and the bushing 31 make it possible simultaneously to dispose the hollow portion 39 at the location of both series of holes 34 and 35 and the surface 38 at the location of the series of holes 36, so as to block the return branch 20 and supply the pressurized oil from the branch 9 to the branch 19. The position described corresponds to the operating position P3 of FIG. 1 and is not in practice a stable position of the slide 32: the passage section or opening that the oil can use to move from the branch 9 to the branch 19 is variable as a function of the position of the slide 32.

The control device 4 comprises an electronic control unit 40 which, as a function of data detected from the engine M such as, for instance, the number of revolutions RPM and other operating parameters, determines the instant of opening and the instant of closure of each valve 2. The unit 40 therefore controls the electromagnet 23 in order to determine, in cascade, the actuation of the selector 15 of the slide distributor valve 16 and the linear actuator 17. The control device 4 further comprises a sensor 41 of the oil temperature T, a sensor 42 of the position of the slide distributor valve 16 and a sensor 43 of the speed of impact of the valve 2.

In FIG. 7, the position sensor 42 comprises two permanent magnets 44 and 45 which are embedded in the slide 32 and are disposed at a distance from one another along the axis 33 equal to the difference between the strokes of the slide 32 needed respectively to open and close the connection between the branch 9 and the branch 19 during the displacement of the slide 32 from left to right in FIG. 7. In substance, the sensor 42 comprises a detector 46 disposed along the bushing 31: the geometry of the slide distributor valve 16 causes the connection between the branch 9 and the branch 19 to begin after the displacement of the slide 32 by a first extent and to be terminated after a displacement of the slide 32 by a second extent. In this way, the detector 46 detects the transit of the magnet 45 (first extent of displacement) which represents the opening of the passage section, and the transit of the magnet 44 which represents the closure of the passage section during a displacement from P1 to P4. For a return displacement from P4 to P1, the details are reversed. In substance, with two thresholds 44 and 45 and a single detector 46, it is possible to identify the opening and closing positions of the passage sections as a result of displacements of the slide 32 in both directions.

The sensor 43 is formed by an accelerometer which detects the impact with which the valve 2 is returned to its respective seat 2A. As an alternative, the sensor 43 is a detonation sensor whose detected and filtered signal is correlated with each valve 2. As a result, therefore, of the detonation sensor on the engine M it is possible to detect the speed of impact of each valve 2 of the engine M.

The unit 40, as well as controlling the electromagnet 23, also controls the pressure regulators 11 and 12 and the passage section of the orifice 22 of variable section.

Figure 2:
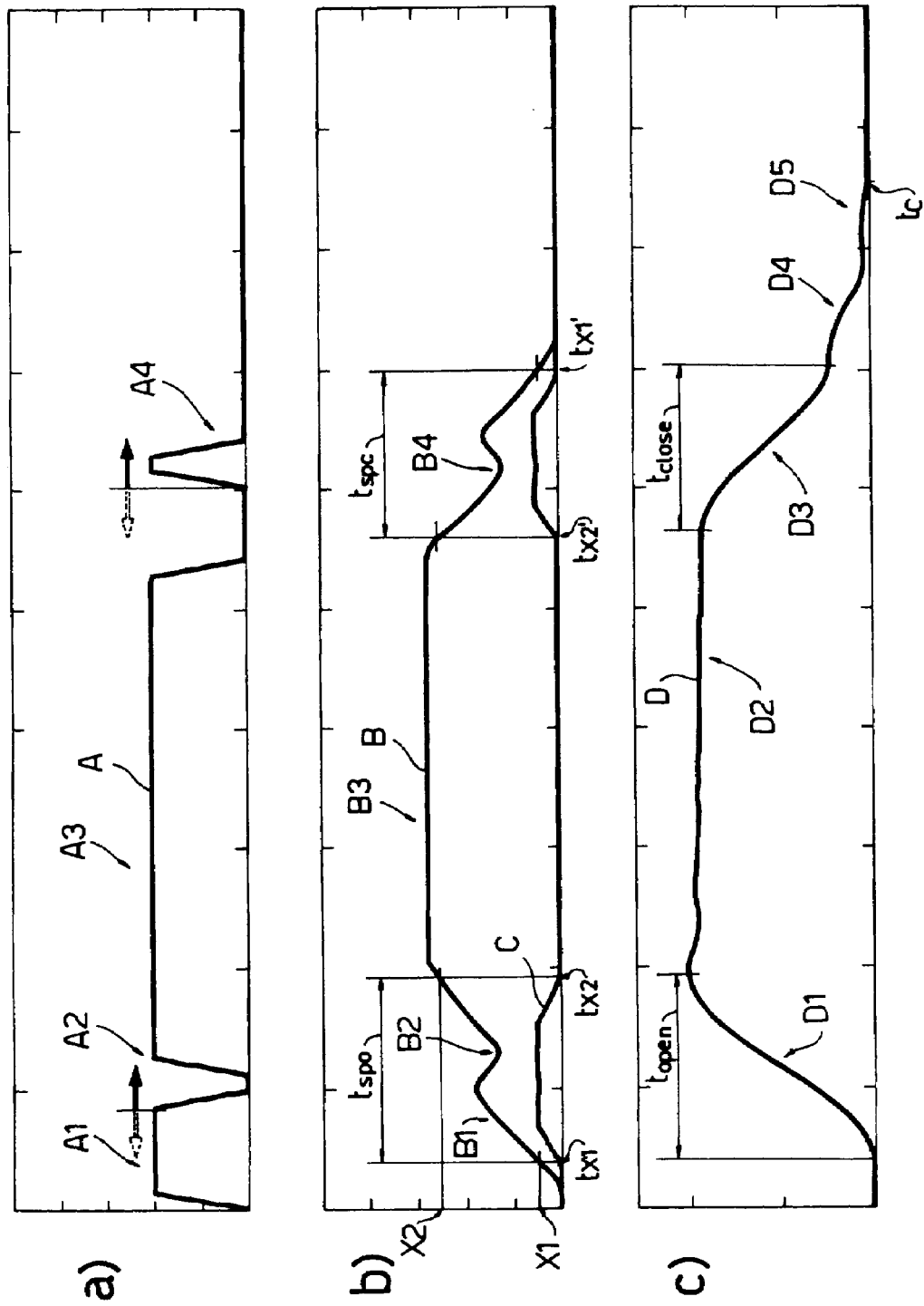
FIG. 2 is a diagram relating to a sequence of positions of various components of the electro-hydraulic unit of FIG. 1.

In operation, the movement of the valve 2 takes place in accordance with the diagram shown in FIG. 2, in which section a) shows the curve A indicative of the displacement (ordinate) of the selector 15 as a function of time (abscissa); section b) shows the curve B indicative of the position (ordinate) of the slide distributor valve 16 and the curve C indicative of the passage section or opening (ordinate) connecting the branch 9 and the branch 19 as a function of time (abscissa); and section c) shows the curve D indicative of the position (ordinate) of the valve 2 as a function of time (abscissa). The sections a), b) and c) are aligned such that the time scales are in phase with one another for all the sections a), b) and c). In this way, it is possible to compare the relations between the positions of the selector 15, the slide distributor valve 16, the effect of the position of the slide distributor valve 16 on the passage section and the position of the valve 2.

The operating principle is based on the fact that the unit 40 excites the electromagnet 23 according to a cycle predetermined as a function of the engine point: i.e. operating parameters such as torque, number of revolutions or emissions. In FIG. 2c, the valve 2 has a predetermined time $t_{open}$ needed to open the valve 2 and a predetermined time $t_{close}$ needed to close the valve 2, at least in part, which are substantially constant and are determined by the equivalent mass and rigidity of the system, where the system is understood as the assembly formed by the piston 28, the valve 2, the spring 29 and the oil contained in the cylinder 27. The times $t_{open}$ and $t_{close}$ are influenced by the characteristics of the oil and are obtained experimentally. In order to obtain the required trajectory of the valve 2 and, at the same time, minimize energy losses, the opening time of the passage section must correspond to $t_{open}$ during the opening phase of the valve and to the time $t_{close}$ during the closing phase of the valve 2.

However, as noted above, the operating position P3 of the slide distributor valve 16 is not a stable position and therefore, without detecting the position of the slide 32, it is impossible to detect the opening time of the passage section. In practice, as shown in FIG. 2b), the sensor 42 detects two points X1 and X2 of the curve B in order to determine the curve C of the passage section. In practice, the unit 40 detects the times $t_{x1}$ and $t_{x2}$ and calculates the time $t_{spo}$, which is equal to the difference between $t_{x2}$ and $t_{x1}$ and represents the time elapsing between the detection of the two points X1 and X2: i.e. the time $t_{spo}$ corresponds to the opening time of the passage section during the opening phase of the valve 2 and may be defined as the actuation time of the actuator 17 during the opening phase of the valve 2. Similarly, the unit 40 calculates the time $t_{spc}$ elapsing between the detection of the two points X2 and X1: the time $t_{spc}$ is equal to the difference between the times $t_{x1}$ and $t_{x2}$ and corresponds to the opening time of the passage section during the closing phase of the valve 2 which may be defined as the actuation time of the actuator 17 during the closing phase of the valve 2. Subsequently, the unit 40 calculates the respective differences between the values of $t_{spo}$ and $t_{spc}$ and the values $t_{open}$ and $t_{close}$ and emits respective error signals $E_o$ and $E_c$ when the differences calculated exceed respective threshold values H and K.

With reference to FIG. 1, in the absence of error signals $E_o$, $E_c$, the selector 15 operates according to a cycle in which the transition from the position shown in FIG. 1 to the connection position of the branches 10 and 18 determines the opening of the valve 2, the maintenance of the connection between the branches 10 and 18 determines the maintenance of the valve 2 in the open position and the discontinuation of the connection between the branches 10 and 18 determines the closure of the valve 2.

With reference to FIG. 2, the unit 40 displaces the selector 15 (portion A1 of curve A) in order to open the valve (portion B1 of curve B of the slide distributor valve 16 and portion D1 of the curve D of the valve 2). Subsequently, in the presence of an error signal $E_o$, the unit 40 moves the selector 15 (portion A2 of curve A) in order temporarily to discontinue the connection between the branches 10 and 18 in the lift phase after the detection of the point X1 and before the detection of the point X2 in order to delay the closure of the passage opening and synchronize the time $t_{spo}$ with the time $t_{open}$. The slide distributor valve 16 oscillates (portion B2 of curve B) in the connection position between the branches 9 and 19.

While the valve 2 is maintained (portion D2 of curve D, FIG. 2c) in the open position, the selector 15 remains in the connection position between the branches 10 and 18 (portion A3 of curve A, FIG. 2a) with the result that the slide distributor valve 16 is disposed in the operating position P4 (portion B3 of curve B, FIG. 2b).

The discontinuation of the connection between the branches 10 and 18 determines the beginning of the closure of the valve 2 (portion D3 of curve D).

In the presence of the error signal $E_c$, the unit 40 temporarily connects the branch 10 to the branch 18 (portion A4 of curve A, FIG. 2a) during the closing phase of the valve 2 after the detection of the point X2 and before the detection of the point X1 in order to delay the closure of the connection between the branches 9 and 19. The slide distributor valve 16 oscillates in the closing phase in the connection position between the branches 9 and 19.

In the embodiment described and illustrated in diagram form in FIG. 2, the selector 15 is actuated after the detection of $t_{x1}$ in order temporarily to disconnect the branches 10 and 18 and vary the connection time $t_{spo}$ during the opening phase. However, this temporary interruption may be carried out before the instant $t_{x1}$.

The unit 40 calculates, at each cycle, the error signals $E_o$ and $E_c$ and possibly adjusts the times $T_{spo}$ and $T_{spc}$ of the successive cycle by adapting the displacement of the slide distributor valve 16 as a function of the times $t_{open}$ and $t_{close}$.

In order to understand the dynamic behavior of the unit 1 it is necessary to bear in mind that during the opening of the valve 2, the assembly formed by the linear actuator 17, in this case the piston 28 and the valve 2, performs, during the predetermined time $t_{open}$, a stroke greater than that needed to bring about an equilibrium between the force of the spring 29 and the pressure of the circuit 3. This can be attributed to the dynamic behavior of the assembly formed by the piston 28, the valve 2, the spring 29 and the oil. Since, in the opening phase of the valve 2, the connection between the branch 9 and the branch 19 is closed and the return branch 20 is closed off, the time needed to establish an equilibrium between the force of the spring 29 and the force of the pressure of the circuit 3 is not available. In practice, as the spring 29 has been dynamically compressed by more than is necessary, it determines a pressure in the cylinder 27 greater than the pressure of the fluid in the branch 9. This situation means that, in the closing phase of the valve 2 when the branches 9 and 19 are connected to one another, part of the oil contained in the cylinder 27 flows back through the branch 19 to the branch 9. In substance, the branch 19 not only performs the function of a supply branch, but also the function of a return branch. The phase of expulsion of the oil from the actuator 17 via the branch 9 is completed in the predetermined time $t_{close}$. This phase of expulsion of the oil via the branch 9 corresponds to the initial phase of closure of the valve 2. It will be appreciated as a result of the friction, the recovery is not complete and the valve 2 is not fully closed at the end of this initial phase.

Subsequently, the slide distributor valve 16 reaches the operating position P1, in which the oil contained in the cylinder 27 is initially discharged via the opening 30 and the branch 20 (section D4 of curve D, FIG. 2c). The displacement of the piston 28 during the discharge of the oil to the tank 7 causes the progressive closure of the opening 30 and the residual oil in the cylinder 7 is therefore discharged via the discharge branch 21 and the orifice 22 (section D5 of curve D, FIG. 2b). The function of the orifice 22 is to slow down the descent of the valve 2 and to keep the speed of closure substantially constant. The unit 40 is able to vary the passage section of the orifice in order to regulate the closure speed. The discharge of the oil first via the branch 20 and then via the branches 20 and 21 corresponds to the final phase of closure of the valve 2.

Figure 3:
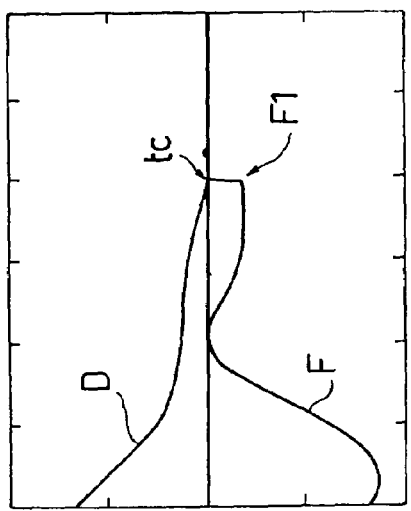
FIGS. 3 and 4 are diagrams relating to a sequence of positions and speeds assumed by the valve.
Figure 4:
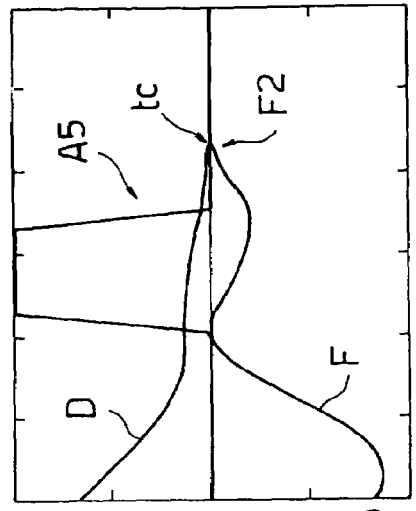
Figure 5:
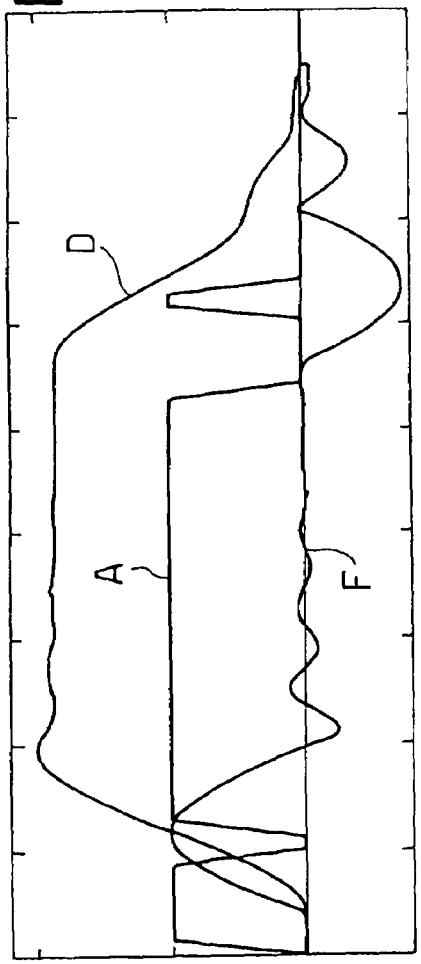
FIGS. 5 and 6 show details, on an enlarged scale, of the diagrams of FIGS. 3 and 4 respectively.
Figure 6:
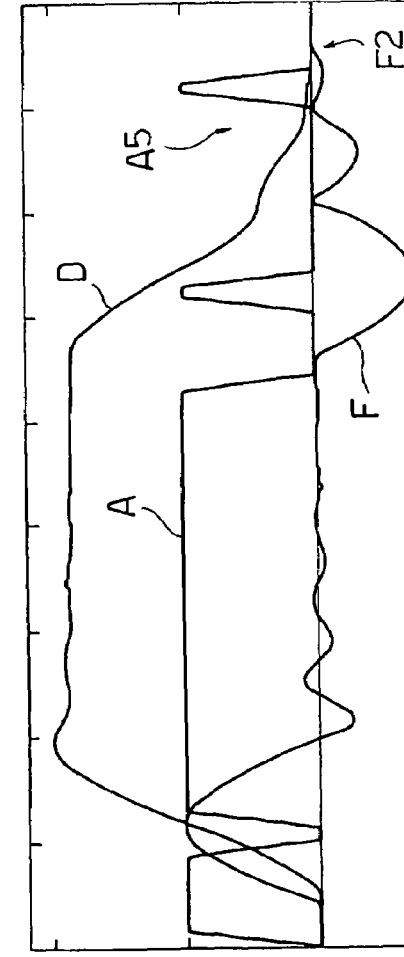

FIG. 3 shows, alongside the curve D relating to the displacement of the valve 2 and the curve A relating to the displacement of the selector 15, the curve F relating to the speed of the valve 2. In FIG. 5, the final section F1 of curve F comprises a substantially horizontal section indicating that the speed is constant (approximately 0.35 m/s) and a substantially vertical section indicating the impact (abrupt deceleration). In FIG. 4, the selector 15 is actuated for an instant during the approach phase of the valve 2 in order to modify the final section F2 of the curve F. This has the effect of slowing down the speed to some 0.05 m/s in order to reduce the impact. In substance, the actuation of the selector 15 and, in cascade, the slide distributor valve 16, makes it possible to control the pressure in the cylinder 27 during the final phase of discharge of the oil.

From an operating point of view, the sensor 43 obtains a magnitude correlated with the speed of impact $V_1$ and the instant $t_c$ in which the valve 2 is closed on its respective seat 2A. The unit 40 obtains the value of the speed of impact $V_1$ and calculates the nominal speed of impact $V_N$ which is a function of the number of revolutions RPM of the engine M: for a low number of revolutions RPM, low speeds of impact $V_I$ are preferable, while for higher numbers of revolutions, higher speeds of impact $V_I$ are tolerable. The control unit 40 calculates the difference between the speed of impact $V_I$ and the nominal speed $V_N$. When this difference is greater than a predetermined threshold value S, the unit 40 calculates and emits an error signal $E_v$ in order to dispose the selector 15 instantaneously in the connection position between the branch 10 and the branch 18 during the final phase of closure of the valve 2 and to displace the slide distributor valve 16 from the operating position P1 to the operating position P2 and to discontinue the discharge of the cylinder 27. The time of supply of the pulse takes place an instant before the instant $t_c$ detected in the previous cycle. The detection of the instant $t_c$ is optional as, on the basis of the cycle assigned, it is possible to predict what the instant of closure of the valve 2 will be.

If the reduction of the speed of impact $V_I$ is insufficient, in the following cycle, following a further emission of the error signal $E_v$, the actuation of the selector 15 is prolonged. As an alternative, the actuation period is kept constant and the instant of actuation is varied. As an alternative, the regulation takes place by combining the two actions described above. The repetition of this control may also cause the slide distributor valve 16 to be brought into the position P3 and to supply pressurized oil into the actuator 17 in order to accentuate the deceleration of the valve 2 and further reduce the speed of impact $V_I$.

The function of the closed-cycle control is to check whether the speed of impact corresponds to a nominal speed $V_N$. It is thus possible to check whether it is also necessary to increase the speed of impact $V_I$ of the previous cycle, for instance when moving from a low to a high number of revolutions of the engine M, in which case the device 4 does not increase the pressure in the cylinder 27.

Both the temporary discontinuation of the discharge, and the temporary supply, of oil are part of the method for controlling the pressure during the final phase of discharge by means of the displacement of the slide distributor valve 16. In substance, the control consists in modulating the pressure increase in the cylinder 27 in order to decelerate the descent of the piston 28 and, thus, the closure of the valve 2. In the pressure modulation, it is also possible to omit the pressure increase in the cylinder 27.

Two methods of slowing down the speed of closure of the valve in the final phase have been described in this description. The first method uses the orifice 22 provided with a calibrated hole, and the second method is based on the control of the slide distributor valve 16. The first and the second method may be used jointly as described or separately.

The closed-cycle control is particularly advantageous, although it will be appreciated that the pressure control in the cylinder 27 during the final discharge phase may also take place in open cycle.

Specific reference has been made in this description to the use of oil as a fluid in the hydraulic system, although it will be appreciated that oil could be replaced by any other fluid without thereby departing from the scope of protection of the present invention.

What is claimed is:

1. A method of controlling the speed of impact ($V_I$) of the valves into their respective seats in an electro-hydraulic actuation unit for the valves of an internal combustion engine (M), the electro-hydraulic unit comprising a hydraulic actuator in order to open a respective valve with a pressurized fluid, a spring opposing the hydraulic actuator in order to close the valve and discharge the fluid from the hydraulic actuator to a collection tank, wherein the pressure of the fluid is controlled, during the final phase of closure of the valve, in the hydraulic actuator by the slide distributor valve, which is a four-way valve of the nonproportional type adapted substantially to assume a first operating stable end position (P1); a second and third transit positions (P2, P3) and a fourth stable end position (P4); the second and third positions (P2, P3) are between the opposing first and fourth positions (P1, P4); in the first operating position (P1) the hydraulic actuator is connected to the collection tank so as to allow the fluid to be discharged from hydraulic actuator and the valve to be closed; in the second operating position (P2) all four ways are disconnected; in the third operating position (P3) the hydraulic actuator is fed with pressurized fluid; and in the fourth operating position (P4) all four ways are disconnected; the slide distributor valve comprising a bushing and a slide reciprocated inside the bushing between the first and the fourth operating positions (P1, P4); the method providing for oscillating said slide in order to transit through at least one of the second, the third, and the fourth operating positions (P2, P3, P4) in order to slow down the discharge of the fluid from the hydraulic actuator.

2. The method of claim 1, characterized in that the pressure of the fluid is temporarily increased, during the final phase of closure of the valve, in the hydraulic actuator.

3. The method of claim 1 characterized in that the hydraulic actuator is temporarily isolated from the collection tank during the final phase of closure of the valve.

4. The method of claim 1 wherein the slide distributor valve is temporarily displaced from the first operating position (P1) to the second operating position (P2) during the final phase of closure of the valve.

5. The method of claim 4 wherein the slide distributor valve is temporarily displaced from the first operating position (P1) to the third operating position (P3) during the final phase of closure of the valve.

6. The method of claim 1 characterized in that a nominal speed ($V_N$) is a function of the number of revolutions (RPM) of the engine (M).

7. The method of claim 1, characterized in that a sensor is adapted to detect an instant ($t_c$) of closure of the valve.

8. The method of claim 7, characterized in that the value of this instant ($t_c$) is used to determine, during the subsequent closure of the valve, the instant at which the pressure in the hydraulic actuator is to be increased in order to limit the speed of impact ($V_I$).

9. The method of claim 1 further comprising the speed of impact ($V_I$) of the valve being detected during the closing phase, and the pressure of the fluid from the tank in the hydraulic actuator being temporarily increased during the final phase of closure of the valve as a function of this speed of impact ($V_I$) and a nominal reference speed ($V_N$); an error signal ($E_V$) being emitted when the speed of impact ($V_I$) exceeds the nominal speed ($V_N$) and the pressure in the hydraulic actuator is varied as a function of this error signal ($E_V$); the speed of impact ($V_I$) being compared with the nominal speed ($V_N$) and the error signal ($E_V$) being emitted when the difference between the speed of impact ($V_I$) and the nominal speed ($V_N$) exceeds a predetermined threshold (S).

10. A device for controlling the speed of impact ($V_I$) of the valves in an electro-hydraulic actuation unit of the valves of an internal combustion engine (M), the electro-hydraulic unit comprising a hydraulic actuator adapted to open a respective valve with a pressurized fluid, a spring opposing the hydraulic actuator in order to close the valve and to discharge the fluid from the hydraulic actuator to a collection tank, the device comprising a slide distributor valve adapted to control, during the final phase of closure of the valve, the pressure of the fluid in the hydraulic actuator; the slide distributor being a four-way valve of the nonproportional type adapted substantially to assume a first operating stable end position (P1); a second and third transit positions (P2, P3) and a fourth stable end position (P4); the second and third positions (P2, P3) are between the opposing first and fourth positions (P1, P4); in the first operating position (P1) the hydraulic actuator is connected to the collection tank so as to allow the fluid to be discharged from hydraulic actuator and the valve to be closed; in the second operating position (P2) all four ways are disconnected; in the third operating position (P3) the hydraulic actuator is fed with pressurized fluid; and in the fourth operating position (P4) all four ways are disconnected; the slide distributor valve comprising a bushing and a slide reciprocated inside the bushing between the first and the fourth operating positions (P1, P4); said slide being oscillated by a hyrdraulic selector in order to transit through at leas one of the second, the third and the fourth operating positions (P2, P3, P4) so as to slow down the discharge of the fluid from the hydraulic actuator.

11. The device of claim 10, characterized in that it comprises means for calculating an error signal ($E_v$) when the speed of impact ($V_I$) exceeds a nominal speed ($V_N$) and means for driving the slide distributor valve as a function of the error signal ($E_v$).

12. The device of claim 10, characterized in that a nominal speed ($V_N$) is a function of the number of revolutions (RPM) of the engine (M).

13. The device of claim 10, characterized in that it comprises a sensor adapted to obtain a signal correlated with the speed of impact ($V_I$) of the valve in the closing phase.

14. The device of claim 10, characterized in that a sensor is an accelerometer.

15. The device of claim 10, characterized in that a sensor is a detonation sensor mounted on the engine.

16. The device of claim 10, further comprising a sensor adapted to obtain a signal correlated with the speed of impact ($V_I$) of the valve in the closing phase; means for calculating an error signal ($E_v$) when the speed of impact ($V_I$) exceeds the nominal speed ($V_N$) and means for driving the slide distributor valve as a function of the error signal ($E_V$); said nominal speed ($V_N$) being a function of the number of revolutions (RPM) of the engine(M).

* * * * *

UNITED STATES PATENT AND TRADEMARK OFFICE
CERTIFICATE OF CORRECTION

PATENT NO. : 7,086,358 B2  Page 1 of 1
APPLICATION NO. : 10/873861
DATED : August 8, 2006
INVENTOR(S) : Marco Panciroli It is certified that error appears in the above-identified patent and that said Letters Patent is hereby corrected as shown below:

Column 10
Claim 10, line 13, "leas" should read --least--.

Signed and Sealed this

Fourteenth Day of November, 2006

JON W. DUDAS
*Director of the United States Patent and Trademark Office*